3,204,877
PHOSPHATE RECOVERY PROCESS
James A. Barr, Jr., Washington, D.C., and Charles H. Greene and Clarence G. Olsen, Lakeland, Fla., assignors to W. R. Grace & Co., New York, N.Y., a corporation of Connecticut
No Drawing. Filed Apr. 9, 1962, Ser. No. 185,857
2 Claims. (Cl. 241—1)

The present invention relates to the beneficiation of phosphate ores, and more specifically to a novel process for separating valuable phosphatic material from the clay and saind contained in a naturally occurring phosphate ore.

Phosphate ore as it is mined from the earth is sometimes defined as a matrix which comprises pieces of phosphate rock and silica imbedded in slimes (clay-like substances). In order to obtain a phosphate rock which is useful for the subsequent production of products such as superphosphate and phosphoric acid, it is desirable to remove substantially all the nonphosphatic material from the matrix.

The prior art discloses numerous processes and means which have been developed to a very high degree and which may be used to obtain a phosphate rock that is reasonably free of slimes and silica. Basically, most all of these processes utilize a complex system of screening and surface washing means which are used in conjunction with agglomeration and flotation steps which serve to further increase the efficiency of the recovery process.

In order to operate a truly efficient recovery process it is generally found that the matrix material, which is initially dug from the ground, must be first disintegrated to as high an extent as possible. Normally, to disintegrate the matrix it is slurried with water and then subjected to a series of screening, abrasion and washing steps. These disintegrating steps serve to break down most of the matrix and permit the subsequent removal of sand and slimes through the use of conventional phosphate recovery processes. Conventional recovery processes usually involve firstly screening the disintegrated matrix to recover the large phosphate rock particles, and secondly, subjecting the fine material which passes through the initial screening step to flotation and agglomeration processes to recover small and intermediate size phosphate particles. The operating efficiency of a recovery process is largely dependent on the removal of substantially all adhering and intermeshed slimes from the phosphate rock. Furthermore, slimes which appear as "mud balls" must first be removed from the material in that "mud balls" which consist primarily of undisintegrated clay matrix will carry through to the subsequent processing steps as would pieces of phosphate rock having substantially the same size. A thorough and efficient disintegration of these "mud balls" has always presented a serious problem in the phosphate recovery industry in that only through long and expensive surface washing may "mud balls" be thoroughly disintegrated.

It is therefore an object of the present invention to provide an improved method for beneficiating phosphate ores.

It is another object to provide a method by which a phosphate rock containing matrix may be effectively prepared for use in a subsequent phosphate recovery process.

It is a further object to provide a method by which a phosphatic matrix may be efficiently and thoroughly disintegrated into its major component parts.

These and still further objectives of the present invention will become readily apparent to one skilled in the art from the following detailed description.

In general, the present invention contemplates a method for preparing a phosphatic material for further beneficiation which comprises breaking the matrix down into its major component parts by means of extremely high pressure jets of water.

More specifically, the present invention involves subjecting a phosphate matrix material as it is mined from the ground to the action of jets of liquid which are maintained at a pressure in excess of about 800 pounds per square inch (p.s.i.) against the surface of the matrix particles. We have found that if a high pressure jet of liquid in the neighborhood of greater than about 800 p.s.i. and preferably in the range of 1,000 to 2,500 p.s.i. is applied to the surface of a phosphate matrix comprised essentially of phosphate rock, slimes and sand, the matrix is effective broken down into its three components which may subsequently be efficiently separated using conventional recovery techniques. Preferably the matrix is treated in the form of a water slurry which contains 60 to 80% solids by weight, however using proper equipment dry matrix may be effectively treated. While greater water content than 20 to 40% is permissible it is found that higher water content absorbs energy and hence reduces the useful work of the high pressure jets which are employed against the solids.

The slurry may be simply prepared by dumping mined matrix into a basin which is agitated by a stream of low pressure water. This slurried matrix which contains about 20 to 30 percent solids, is then pumped from the basin to the point of treatment. Before high pressure disintegration is commenced, using the herein contemplated high pressure jet technique, the solids content of the slurry is preferably increased to about 60 to 80 percent. This water removal may be conveniently carried out in a conventional cyclone apparatus. Subsequent to removing excess water the slurry is passed into a zone wherein high pressure jets of liquid strike substantially all the surfaces of the slurry particles with a force greater than about 800 p.s.i. The liquid under pressure will produce a calculable nozzle velocity as it is issued from the spray nozzles. A pressure of 800 p.s.i. will produce a nozzle velocity of about 342 ft./sec.

It is generally preferred that a multiplicity of high pressure jets be used to apply the high pressure water rather than a single jet which would supply an equal volume per minute of water under the same pressure. The use of such multiple jets increases the probability of contact of each matrix particle with the jets. The precise number of jets used and their specific configuration will depend on the specific apparatus utilized.

The length of time the matrix remains in the high pressure jet zone depends on numerous empirical factors such as the initial size of the matrix particles, the specific water flow rate and the pressure used. Generally speaking the residence time of the matrix in the jet zone will be that time required to achieve complete disintegration. It is frequently found that using the herein specified pressures of 800–2500 lbs. p.s.i. and higher, a complete disintegration of the matrix is possible in a time substantially less than a minute. When this period is compared with the time required to achieve disintegration using conventional abrasion techniques, which may require up to several hours, a substantial saving in both processing time and power is achieved.

When the matrix is hit with the high pressure jet of liquid it disintegrates into a mixture of sand, slimes and phosphate rock particles. Furthermore, tightly adhering slimes, which are found on the surface and in the interstices of the phosphate rock particles, are completely and efficiently removed. When "clay balls" which invariably occur in the matrix feed are struck with the high pressure jet the disintegration effect is two-fold. Firstly, the force of the water striking the clay ball serves to cause shattering thereof. And secondly, since the high pressure jet of water is forced into the interior of the clay ball, a disruption due to hydration of the clay itself is achieved.

Subsequent to treatment with high pressure water, the disintegrated matrix material, which now comprises a physical mixture of phosphate rock, slimes, and silica, is subjected to a conventional phosphatic recovery system. Normally, the phosphate recovery procedure will commence with the screening of the disintegrated mass to recover substantially all the phosphate rock particles of a size greater than about 14 mesh. This particle range of phosphate, which is sometimes referred to as washer rock and which in many cases represents a large proportion of the phosphate values recovered from a given matrix, will possess a degree of purity which was heretofore unobtainable by prior processes. The high pressure water washing system contemplated herein serves both to scrub the surface and interstices of the washer rock free from slime material. And also since the high pressure washing system effectively disintegrates all the clay balls in the initial matrix feed, the washer rock will be substantially free of clay balls which fall within the plus 14 mesh size. Prior art processes cannot, under reasonable operating conditions, effectively separate clay balls falling in the washer rock size range.

The material which passes through the initial screening step which normally falls in a minus 14 mesh size range is then passed through conventional flotation and agglomeration steps to recover the small and intermediate size phosphate rock particles. Again since the high pressure washing system disintegrates substantially all the clay balls, including those in the minus 14 mesh size range, the flotation and agglomeration feed is effectively freed of slimes which heretofore have served to cause uneconomical use of flotation and agglomeration reagents and which serve to generally foul most recovery systems.

The high pressure jets of liquid used herein are obtained by any conventional means. Ordinarily, sufficiently high volumes of liquid under the pressures required herein may be obtained from both large capacity positive displacement piston type pumps and multiple stage centrifugal pumps. The nozzles used in the present process to direct the high pressure jets of water will effectively and thoroughly play the high pressure jets of water upon the matrix.

During treatment of the matrix material with the high pressure jets of water it is generally preferred that the matrix be placed through some type of closed conduit system which will prevent excessive loss of both water and matrix material. However, alternatively open conveyor type apparatus may be utilized if loss of water is not considered a disadvantage.

*Example*

Florida pebble phosphate ore as mined and slurried in 20 to 40% by weight of water which contained particles up to about 4 inches in diameter was passed through a cyclone to increase the solids content to about 70%. The slurry was then passed through a round 18 inch conduit equipped with a plurality of high pressure spray nozzles. The phosphate ore was passed through the conduit at a rate of about 60 tons per hour. The moving material as it passed through the conduit was sprayed with about 100 gallons per minute of water maintained at a pressure of about 2500 p.s.i. The material obtained from the process contained no substantial "clay balls." Furthermore, the phosphatic rock material obtained by this procedure was scoured free of all foreign material. The power required to produce a satisfactorily disintegrated product was about 2 hydraulic horsepower per ton.

Although the method of the present invention is specifically directed to the beneficiation of phosphate ores, it should be understood that the high pressure disintegrating technique defined herein may be applied to other mineral containing ores that possess matrix type structures.

We claim:

1. A method for beneficiating phosphatic ores which comprises forming a slurry of phosphate ore and water, subjecting said slurry to high velocity jets of water having a nozzle velocity in excess of 342 ft./sec. which strike the particles in said slurry whereby said ore is substantially disintegrated into its component parts and recovering phosphate values from said disintegrated ore.

2. The method of claim 1 wherein said phosphate ore slurry contains from about 60 to about 80 percent solids by weight.

References Cited by the Examiner

UNITED STATES PATENTS

| | | | |
|---|---|---|---|
| 295,992 | 4/84 | Fairfield et al. | 209—458 X |
| 2,164,052 | 6/39 | Bullwinkel | 241—14 |
| 2,571,866 | 10/51 | Greene | 241—20 X |

J. SPENCER OVERHOLSER, *Primary Examiner.*

ROBERT A. O'LEARY, *Examiner.*